United States Patent
Cleveland

(10) Patent No.: US 7,362,790 B2
(45) Date of Patent: Apr. 22, 2008

(54) APPARATUS AND METHOD FOR GENERATING PSEUDO-REPLICA SIGNALS IN A CDMA COMMUNICATION SYSTEM

(75) Inventor: Joseph R. Cleveland, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 677 days.

(21) Appl. No.: 10/872,950

(22) Filed: Jun. 21, 2004

(65) Prior Publication Data

US 2005/0250460 A1    Nov. 10, 2005

Related U.S. Application Data

(63) Continuation-in-part of application No. 10/841,256, filed on May 7, 2004.

(51) Int. Cl.
*H04B 1/00* (2006.01)
(52) U.S. Cl. ...................................... 375/136; 375/139
(58) Field of Classification Search ................ 375/130, 375/139, 142, 143, 147, 144, 148, 152, 136
See application file for complete search history.

(56) References Cited

U.S. PATENT DOCUMENTS 5,029,180 A * 7/1991 Cowart ....................... 375/141
7,158,560 B2 * 1/2007 Cleveland ................... 375/148
2004/0008759 A1 * 1/2004 Yang .......................... 375/152
2005/0249109 A1 * 11/2005 Cleveland ................... 370/203
2005/0265274 A1 * 12/2005 Cleveland ................... 370/320

* cited by examiner

*Primary Examiner*—Emmanuel Bayard

(57) ABSTRACT

A noise reduction circuit for improving a signal-to-noise ratio of an input signal corresponding to a predetermined sequence of chips, each of the chips having a value corresponding to Logic 0 or Logic 1. The noise reduction circuit comprises a sampling circuit for generating a first sequence of samples of the input signal; a controller for identifying samples in the first sequence of samples corresponding to Logic 0 chips and Logic 1 chips; and a randomizing circuit. The randomizing circuit generates a second sequence of samples by at least one of: i) shifting-positions within the first sequence of samples of some of the identified Logic 0 samples; and ii) shifting positions within the first sequence of samples of some of the identified Logic 1 samples corresponding to Logic 1 chips. The first and second sequences of samples may then be combined to generate an improved composite signal.

20 Claims, 8 Drawing Sheets

APPARATUS AND METHOD FOR GENERATING PSEUDO-REPLICA SIGNALS IN A CDMA COMMUNICATION SYSTEM

CROSS-REFERENCE TO RELATED APPLICATION

The present invention is related to that disclosed in U.S. patent application Ser. No. 10/841,256, entitled "Apparatus and Method for Improving Signal-to-Noise Ratio in a Multi-Carrier CDMA Communication System," filed on May 7, 2004. Patent application Ser. No. 10/841,256 is assigned to the assignee of the present application. The subject matter disclosed in patent application Ser. No. 10/841,256 is hereby incorporated by reference into the present disclosure as if fully set forth herein. The present application is a continuation-in-part (CIP) of patent application Ser. No. 10/841,256 and hereby claims priority under 35 U.S.C. §120 to the filing date of patent application Ser. No. 10/841,256.

TECHNICAL FIELD OF THE INVENTION

The present invention is directed, in general, to wireless communications devices and, more specifically, to an RF receiver having a lower signal-to-noise ratio.

BACKGROUND OF THE INVENTION

Wireless communications systems, including cellular phones, paging devices, personal communication services (PCS) systems, and wireless data networks, have become ubiquitous in society. Wireless service providers continually try to create new markets for wireless devices and to expand existing markets by making wireless devices and services cheaper and more reliable. The price of end-user wireless devices, such as cell phones, pagers, PCS systems, and wireless modems, has been driven down to the point where these devices are affordable to nearly everyone and the price of a wireless device is only a small part of the total cost to the end-user. To continue to attract new customers, wireless service providers concentrate on reducing infrastructure costs and operating costs, and on increasing handset battery lifetime, while improving quality of service in order to make wireless services cheaper and better.

To maximize usage of the available bandwidth, a number of multiple access technologies have been implemented to allow more than one subscriber to communicate simultaneously with each base station (BS) in a wireless system. These multiple access technologies include time division multiple access (TDMA), frequency division multiple access (FDMA), direct sequence code division multiple access (DS-CDMA), orthogonal frequency division multiplexing (OFDM), orthogonal frequency division multiple access (OFDMA), and multi-carrier code division multiple access (MC-CDMA). These technologies assign each system subscriber to a specific traffic channel that transmits and receives subscriber voice/data signals via a selected time slot, a selected frequency, a selected unique modulation code, a sub-carrier constellation, or a combination thereof.

DS-CDMA technology is used in wireless computer networks, paging (or wireless messaging) systems, and cellular telephony. In a CDMA system, mobile stations (e.g., pagers, cell phones, laptop PCs with wireless modems) and base stations transmit and receive data in assigned channels that correspond to specific unique codes. For example, a mobile station may receive forward channel data signals from a base station that are convolutionally coded, formatted, interleaved, spread with a Walsh code and a long pseudo-noise (PN) sequence. In another example, a base station may receive reverse channel data signals from the mobile station that are convolutionally encoded, block interleaved, modulated by a M-ary orthogonal modulation, and spread prior to transmission by the mobile station. The data symbols following interleaving may be separated into an in-phase (I) data stream and a quadrature (Q) data stream for QPSK modulation of an RF carrier. One such implementation of DS-CDMA is found in the TIA IS-95 CDMA standard. Another implementation is the TIA/EIA IS-2000 standard.

MC-CDMA technology is another technology used in wireless computer networks, paging (or wireless messaging) systems, and cellular telephony. In one example of a MC-CDMA system, convolutionally coded, formatted and interleaved user data is copied into N parallel subcarrier paths. Each of the N identical data bits is modulated by a single chip: belonging to a spreading code of length N. Each data symbol simultaneously is applied to an Inverse Fast Fourier Transform (IFFT) function to modulate a different subcarrier with binary phase shift keying (BPSK). The subcarriers are separated by M/Tb Hz, where M is an integer and Tb is the modulation symbol duration. Users are identified by different modulation codes in the frequency domain. Different users transmit on the same set of subcarriers, but with different spreading codes, in the frequency domain. In some embodiments, control and pilot signals may modulate another set of subcarriers by the method described above.

In another example of a MC-CDMA system, convolutionally coded, formatted and interleaved user data is first copied into N parallel paths, where each copy of the data bit is multiplied by a chip of an N-chip spreading code assigned to the specific user. The set of N data chips is mapped by pairs into an in-phase (I) chip stream and a quadrature (Q) chip stream for QPSK modulation of each of N/2 different subcarriers. The subcarriers are combined in a combiner and then amplified and transmitted. Users are identified by different modulation codes in the frequency domain. Different users transmit on the same set of subcarriers, but with different spreading codes, in the frequency domain. Control and pilot signals also may be transmitted in this manner.

Upon reception of the MC-CDMA modulated RF signal, the received complex signal envelope is sampled and converted into a set of subcarriers using a Fast Fourier Transform (FFT). If the MC-CDMA modulation uses QPSK or QAM, the received RF signal is converted into an I-signal stream and a Q-signal stream prior to sampling and subcarrier conversion using the FFT. Each chip in the spread data stream is integrated over a symbol period to recover the symbol value. The output from each of the integrators is then converted from parallel format to serial format and the serial data stream is multiplied by the spreading code to recover the original user data stream. If the transmitter added a guard band, it is removed prior to the FFT stage.

In order to increase the reliability of CDMA receivers, base stations and wireless terminals frequently transmit M copies of the same signal, staggered in time, to the other device. The receiving device typically uses multiple receive paths, such as in a Rake receiver, to capture each of the copies. The captured copies are summed to produce a composite signal in order to improve the signal-to-noise ratio (SNR). This allows the composite signal to be more easily de-spread and recognized by a signal correlator or matched filter. However, this approach requires a large number of components and a large circuit area. Additionally, the repeated transmission of M copies of the same signal is wasteful of scarce bandwidth.

Furthermore, wireless digital communication systems increasingly are using multicarrier CDMA (MC-CDMA) and orthogonal frequency division multiplexing (OFDM) CDMA. In OFDM-CDMA, different wireless terminals (or mobile stations) are allocated different frequency spreading codes. The advantage of OFDM-CDMA is that the number of codes assigned to each wireless terminal is adjustable, leading to different data rates for different wireless terminals. However, the fact that each wireless terminal must transmit its signal over the entire spectrum leads to an averaged-down effect in the presence of deep fading and narrowband interference.

U.S. Pat. No. 6,683,908 to Cleveland disclosed an apparatus and a method that eliminate the need to transmit M copies of the same signal in order to improve signal reception. The teachings of U.S. Pat. No. 6,683,908 are hereby incorporated by reference into the present application as if fully set forth herein.

The apparatus and method of U.S. Pat. No. 6,683,908 eliminate the need to transmit M copies of the same signal by storing in memory an original copy of the received signal and generating pseudo-replicas using the stored samples of the original received signal. Each pseudo-replica is generated by randomly interchanging samples of the original received signal that occurred during time slots of the original received signal that correspond to Logic 1 and by randomly interchanging signal samples that occurred during time slots of the original received signal that correspond to Logic 0. The original signal and one or more pseudo-replicas are then combined to form a composite signal that has an improved signal-to-noise ratio (SNR).

The SNR is improved because noise in communication systems is not coherent and tends to cancel when the pseudo-replicas are repeatedly added together. But the signal is coherent and the signal components tend to add together as the pseudo-replicas are repeatedly added together. Thus, the SNR improves.

The apparatus and method of U.S. Pat. No. 6,683,908 operate on samples from time domain signals. This is not ideally suited for the frequency domain signals that are, present in MC-CDMA and OFDM-CDMA receivers. Moreover, the apparatus and method of U.S. Pat. No. 6,683,908 are better suited to operating on samples at relatively low data rates. At the high data rates seen in newer CDMA communication system, the apparatus and method disclosed in U.S. Pat. No. 6,683,908 may be inadequate.

There is therefore a need in the art for improved multi-carrier CDMA communication systems that have an improved signal-to-noise ratio in the receiver. In particular, there is a need for multi-carrier CDMA communication-systems that are not required to transmit multiple copies of a signal in order to improve SNR in the receiver. More particularly, there is a need for multi-carrier CDMA receivers that can operate at high data rates without requiring the transmission of multiple copies of the forward channel signal.

SUMMARY OF THE INVENTION

The present invention improves the detection and demodulation of digital data in multi-carrier CDMA (MC-CDMA) communication systems and OFDM-CDMA communication systems. The present invention may be implemented in any system that employs frequency division duplexing (FDD) or time division duplexing (TDD). This present invention reduces the required energy per chip in processing multiple, reconstructed samples of the received signal. This allows a CDMA receiver to operate closer to the Shannon limit. The method is very useful for improved reception of overhead signals in systems employing smart antenna technology, where the transmission of overhead signals does not employ adaptive beam forming.

The assignee of the present application has also filed U.S. patent application Ser. No. 10/841,256, entitled "Apparatus and Method for Improving Signal-to-Noise Ratio in a Multi-Carrier CDMA Communication System," which discloses improvements to U.S. Pat. No. 6,683,908 that are more suited to operating on frequency domain signals. The subject matter disclosed in U.S. patent application Ser. No. 10/841,256 is hereby incorporated by reference into the present disclosure as if fully set forth herein. The present invention provides an apparatus and method for generating pseudo-replica signals at high data rates that may be used with time domain signals, as in the case of U.S. Pat. No. 6,683,908, or with frequency domains signals, as in the case of U.S. patent application Ser. No. 10/841,256.

To address the above-discussed deficiencies of the prior art, it is a primary object of the present invention to provide, for use in a CDMA receiver, a noise reduction circuit for improving a signal-to-noise ratio of an input signal corresponding to a predetermined sequence of chips, each of, the chips having a value corresponding to Logic 0 or Logic 1. According to an advantageous embodiment, the noise reduction circuit comprises: 1) a sampling circuit capable of generating a first sequence of samples of the input signal; 2) a controller capable of identifying samples in the first sequence of samples corresponding to Logic 0 chips and identifying samples in the first sequence of samples corresponding to Logic 1 chips; and 3) a randomizing circuit. The randomizing circuit generates a second sequence of samples by at least one of: i) shifting positions within the first sequence of samples of at least some of the identified samples corresponding to Logic 0 chips, wherein each of the shifted samples corresponding to Logic 0 chips is shifted from a first position corresponding to a Logic 0 chip to a second position corresponding to a Logic 0 chip; and ii) shifting positions within the first sequence of samples of at least some of the identified samples corresponding to Logic 1 chips, wherein each of the shifted samples corresponding to Logic 1 chips is shifted from a first position corresponding to a Logic 1 chip to a second position corresponding to a Logic 1 chip.

According to one embodiment of the present invention, the noise reduction circuit further comprises a memory coupled to the randomizing circuit capable of storing the first sequence of samples in a first sample set and storing the second sequence of samples in a second sample set.

According to another embodiment of the present invention, the noise reduction circuit further comprises a combiner circuit capable of adding the first and second sequences of samples in the memory to thereby generate a composite sequence of samples having a reduced signal-to-noise ratio.

According to still another embodiment of the present invention, the noise reduction circuit further comprises a matched filter for correlating the composite sequence of samples with the predetermined sequence of chips.

According to yet another embodiment of the present invention, the CDMA receiver is disposed in a base station of a wireless network.

According to a further embodiment of the present invention, the CDMA receiver is disposed in a mobile station capable of communicating with a wireless network.

According to a still further embodiment of the present invention, the randomizing circuit shifts positions of the at least some of the identified samples corresponding to Logic 0 chips according to one of a random process algorithm and a predetermined algorithm.

According to a yet further embodiment of the present invention, the randomizing circuit shifts positions of the at least some of the identified samples corresponding to Logic 1 chips according to one of a random process algorithm and a predetermined algorithm.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
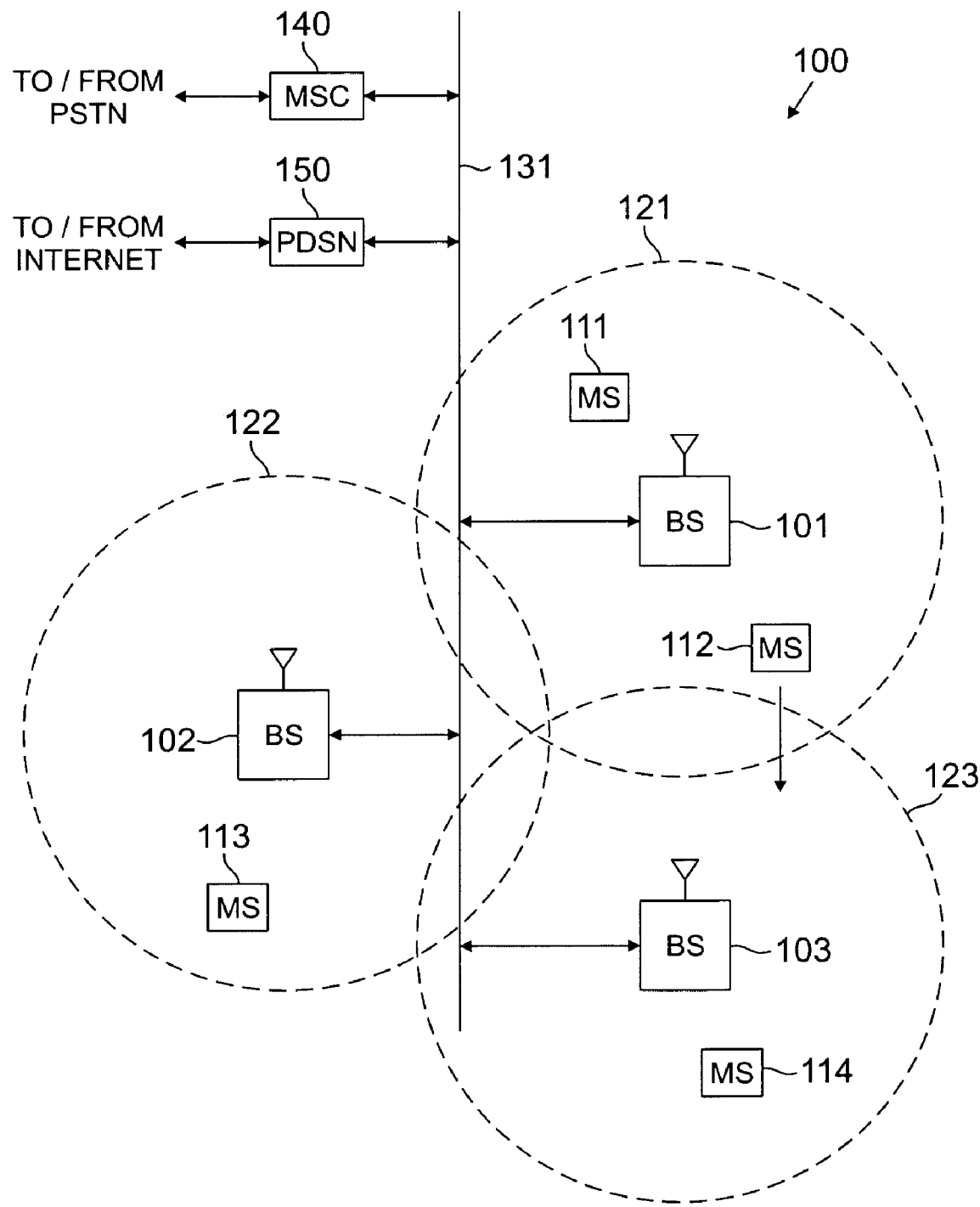
FIG. 1 illustrates an exemplary wireless network that implements wireless receivers according to the principles of the present invention.

FIG. 1 illustrates exemplary wireless network 100, which implements wireless receivers according to the principles of the present invention. Wireless network 100 comprises a plurality of cell sites 121-123, each containing one of the base stations, BS 101, BS 102, or BS 103. According to the principles of the present invention, base stations 101-103 communicate with a plurality of mobile stations (MS) 111-114 using multi-carrier (MC) code division multiple access (CDMA) channels or orthogonal frequency division multiplexing (OFDM) CDMA channels. In an advantageous embodiment of the present invention, mobile stations 111-114 are capable of receiving data traffic and/or voice traffic on two or more multi-carrier (MC) CDMA or OFDM-CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations-101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers.

For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Figure 2:
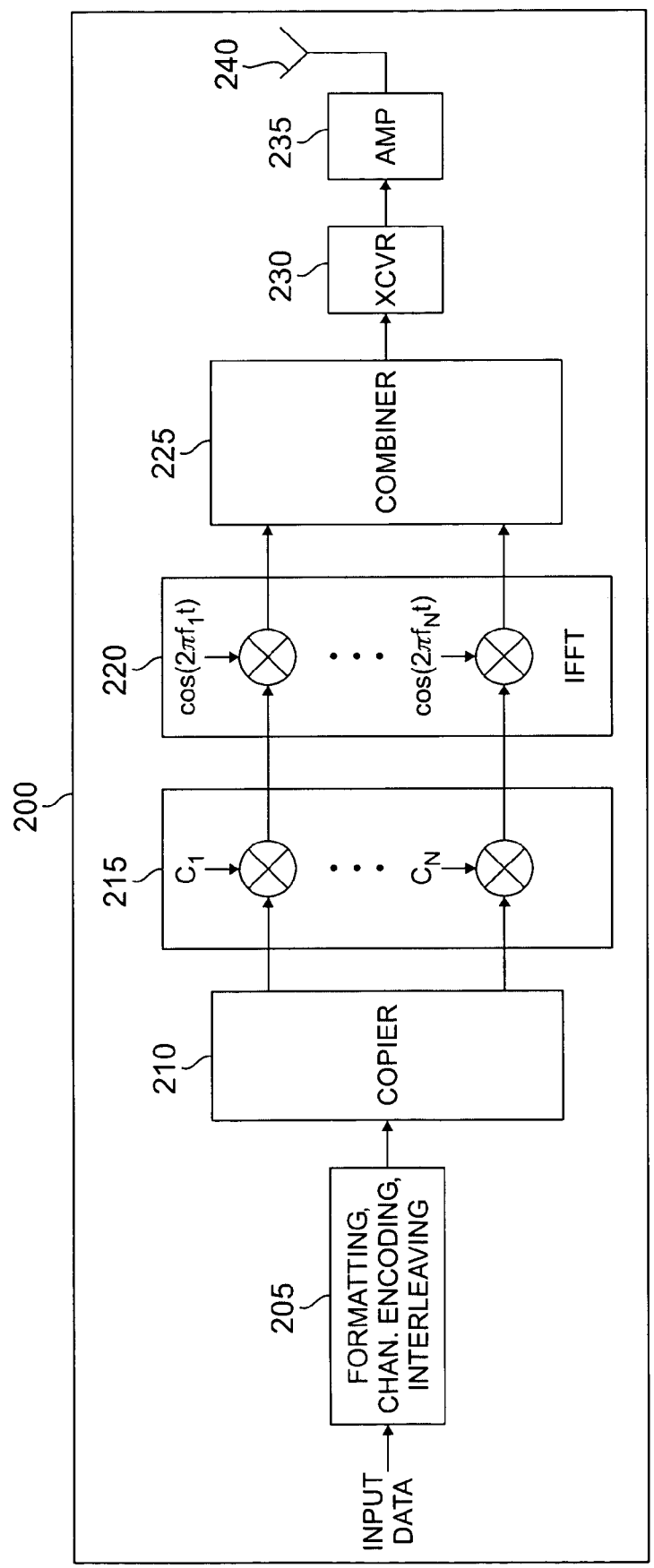
FIG. 2 illustrates a transmit path of a conventional multicarrier CDMA wireless device using BPSK modulation according to an exemplary embodiment of the prior art.

FIG. 2 illustrates a transmit path of exemplary multicarrier CDMA wireless device 200 using BPSK modulation according to an exemplary embodiment of the prior art. In FIG. 2, MC-CDMA wireless device 200 may be, for example, base station (BS) 101 or mobile station (MS) 111. The exemplary architecture of MC-CDMA wireless device 200 is similar to that of conventional MC-CDMA wireless devices.

The transmit path of exemplary MC-CDMA wireless device 200 comprises frame formatting, channel encoding and interleaving block 205, copier block 210, spreading chip multiplier stages 215 of length N, and subcarrier multiplier block 220, which may be implemented, for example, as an Inverse Fast Fourier Transform (IFFT) block. The transmit path of MC-CDMA-CDMA wireless device 200 further comprises combiner 225, transceiver (XCVR) 230, amplifier 235 and antenna 240.

Frame formatting, channel encoding, interleaving and spreading block 205 represent conventional circuitry typically found in an MC-CDMA or OFDM-CDMA communication system. Frame formatting, channel encoding, interleaving and spreading block 205 receives input data signals that are to be transmitted and performs such conventional functions as formatting the input data into frames, channel-encoding the formatted input data frames, and interleaving the encoded data with other data streams.

Copier block 210 generates N copies of the encoded user data stream at the output of frame formatting, channel encoding, interleaving and spreading block 205. Spreading chip multiplier stages 215 receives the N data streams generated by copier block 210 and spreads the data streams by multiplying each data stream by a chip sequence $C_i$. Chip sequences $C_1$ through $C_N$ may be, for example, Walsh codes.

IFFT block 220 generates a multi-carrier signal, wherein the presence of a positive sinc function carrier at each output of IFFT block 220 is determined by the existence of a Logic 1 chip at a corresponding input of IFFT block 220. For example, IFFT block 220 may have eight inputs and may generate eight corresponding sinc function outputs centered at the frequencies $f_0$, $f_1$, $f_2$, $f_3$, $f_4$, $f_5$, $f_6$, and $f_7$. If IFFT block 220 receives the byte [01110101], then positive sync carriers are generated at the frequencies centered at $f_1$, $f_2$, $f_5$, and $f_7$. A Logic 1 chip value produces a positive amplitude sinc function (such as in FIG. 8) on a corresponding output of IFFT block 220. A Logic 0 chip value produces a negative amplitude sinc function (inverse of FIG. 8) on a corresponding output of IFFT block 220.

In the illustrated example, the input data signals are represented by a set of $2^N$ sub-carriers. If the sub-carriers are separated in frequency with spacing equal to the inverse of the chip rate, then the output of IFFT block 220 represents an OFDM signal. Combiner 225 sums the multiple sub-carriers prior to up-conversion to the transmission frequency by transceiver 230. Amplifier 235 amplifies the up-converted RF signal prior to transmission by antenna 240. For operation in TDD mode, combiner 225 inserts a guard interval (GI) in the signal.

Figure 3:
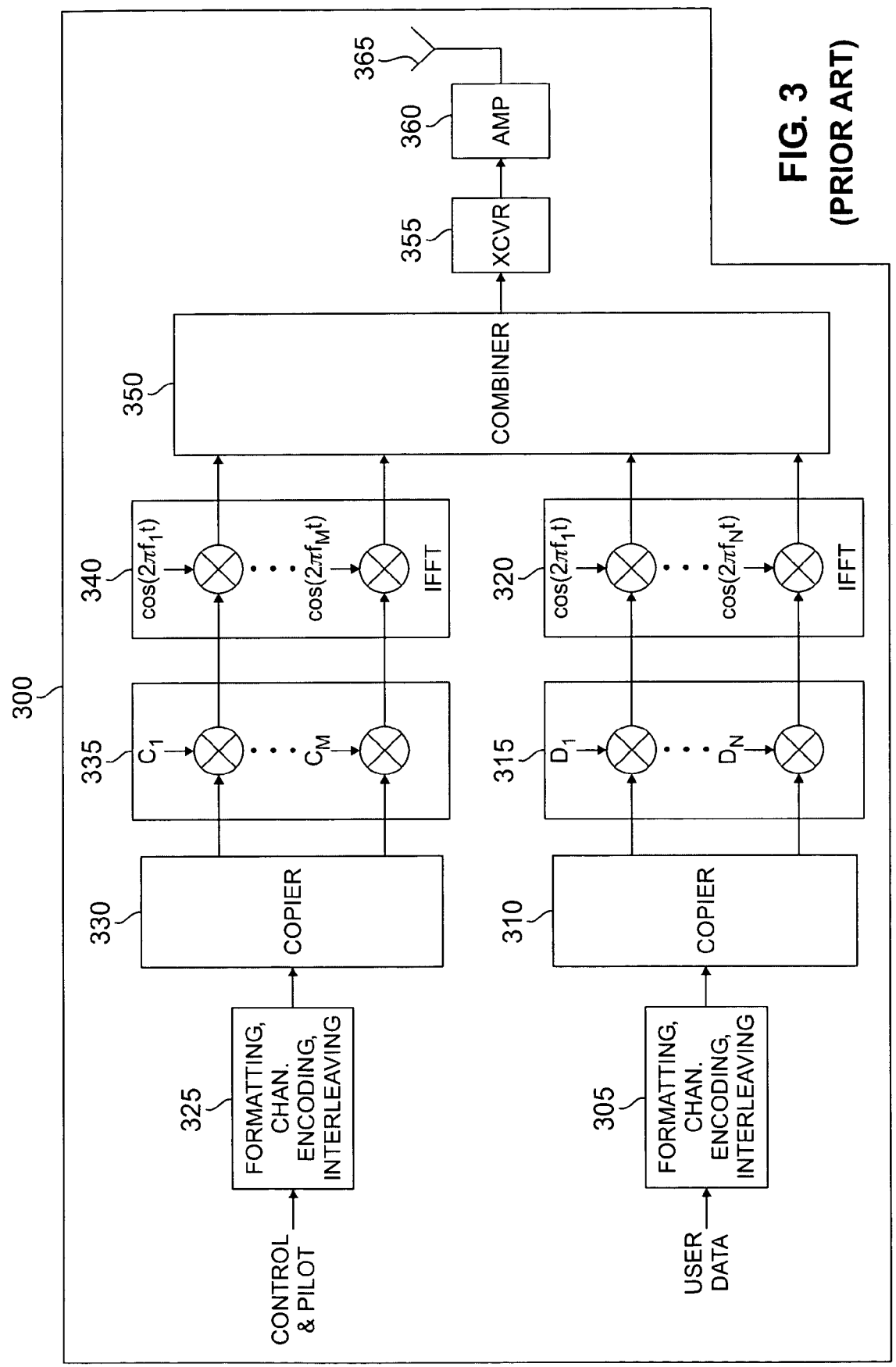
FIG. 3 illustrates a transmit path of a conventional multicarrier CDMA wireless device using BPSK modulation and separate modulation paths for control and pilot signals and user data signals according to an exemplary embodiment of the prior art.

FIG. 3 illustrates a transmit path of conventional multi-carrier CDMA wireless device 300, which uses BPSK modulation and separate modulation paths for control and pilot signals and user data signals according to an exemplary embodiment of the prior-art. In FIG. 3, the MC-CDMA wireless device 300 may be, for example, base station (BS) 101 or mobile station (MS) 111. The exemplary architecture of MC-CDMA wireless device 300 is similar to that of conventional MC-CDMA wireless devices.

The transmit path of exemplary MC-CDMA wireless device 300 comprises frame formatting, channel encoding and interleaving block 305, copier block 310, spreading chip multiplier stages 315 of length N, and subcarrier multiplier block 320, which may be implemented, for example, as an Inverse Fast Fourier Transform (IFFT) block. The transmit path of MC-CDMA wireless device 300 further comprises frame formatting, channel encoding and interleaving block 325, copier block 330, spreading chip multiplier stages 335 of length M, and subcarrier multiplier block 340, which may be implemented, for example, as an Inverse Fast Fourier Transform (IFFT) block. The remaining portion of the transmit path of MC-CDMA-CDMA wireless device 300 comprises combiner 350, transceiver (XCVR) 355, amplifier 360 and antenna 365.

Frame formatting, channel encoding, interleaving and spreading blocks 305 and 325 represent conventional circuitry typically found in an MC-CDMA or OFDM-CDMA communication system. Frame formatting, channel encoding, interleaving and spreading block 305 receives user data signals that are to be transmitted and performs such conventional functions as formatting the user data into frames, channel-encoding the formatted data frames, and interleaving the encoded data with other data streams. Frame formatting, channel encoding, interleaving and spreading block 320 receives control and pilot signals that are to be transmitted and performs such conventional functions as formatting the control and pilot signals into frames, channel-encoding the formatted control and pilot signals, and interleaving the encoded control and pilot signals.

Copier block 310 generates N copies of the encoded user data stream at the output of frame formatting, channel encoding, interleaving and spreading block 305. Spreading chip multiplier stages 315 receives the N data streams generated by copier block 310 and spreads the data streams by multiplying each data stream by a chip sequence $D_i$. Chip sequences $D_1$ through $D_N$ may be, for example, Walsh codes. Similarly, copier block 330 generates M-copies of the encoded control and pilot signals at the output of frame formatting, channel encoding, interleaving and spreading block 325. Spreading chip multiplier stages 335 receives the M data streams generated by copier block 330 and spreads the data streams by multiplying each data stream by a chip sequence $C_i$. Chip sequences $C_1$ through $C_M$ may be, for example, Walsh codes.

Each of IFFT block 320 and IFFT block 340 generates a multi-carrier signal, wherein the presence of a positive sinc function carrier at each output of IFFT block 320 (or IFFT block 340) is determined by the existence of a Logic 1 chip at a corresponding input of IFFT block 320 and IFFT block 340. For example, IFFT block 320 or IFFT block 340 may have eight inputs and may generate eight corresponding sinc function outputs centered at the frequencies $f_0$, $f_1$, $f_2$, $f_3$, $f_4$, $f_5$, $f_6$, and $f_7$. If IFFT block 320 receives the byte [01100101], then positive sync carriers are generated at the frequencies centered at $f_1$, $f_2$, $f_5$, and $f_7$. A Logic 1 chip value produces a positive amplitude sinc function (such as in FIG. 8) on a corresponding output of IFFT 320. A Logic 0 chip value produces a negative amplitude sinc function (inverse of FIG. 8) on a corresponding output of IFFT 320.

In the illustrated example, user data signals are represented by a set of $2^N$ sub-carriers and the pilot and control signals are represented by a set of $2^M$ separate sub-carriers. If the sub-carriers are separated in frequency with spacing equal to the inverse of the chip rate, then the IFFT output represents an OFDM signal. Combiner 350 sums the multiple sub-carriers prior to up-conversion to the transmission frequency by transceiver 355. Amplifier 360 amplifies the up-converted RF signal prior to transmission by antenna 365. For operation in TDD mode, combiner 350 inserts a guard interval (GI) in the signal.

Figure 4:
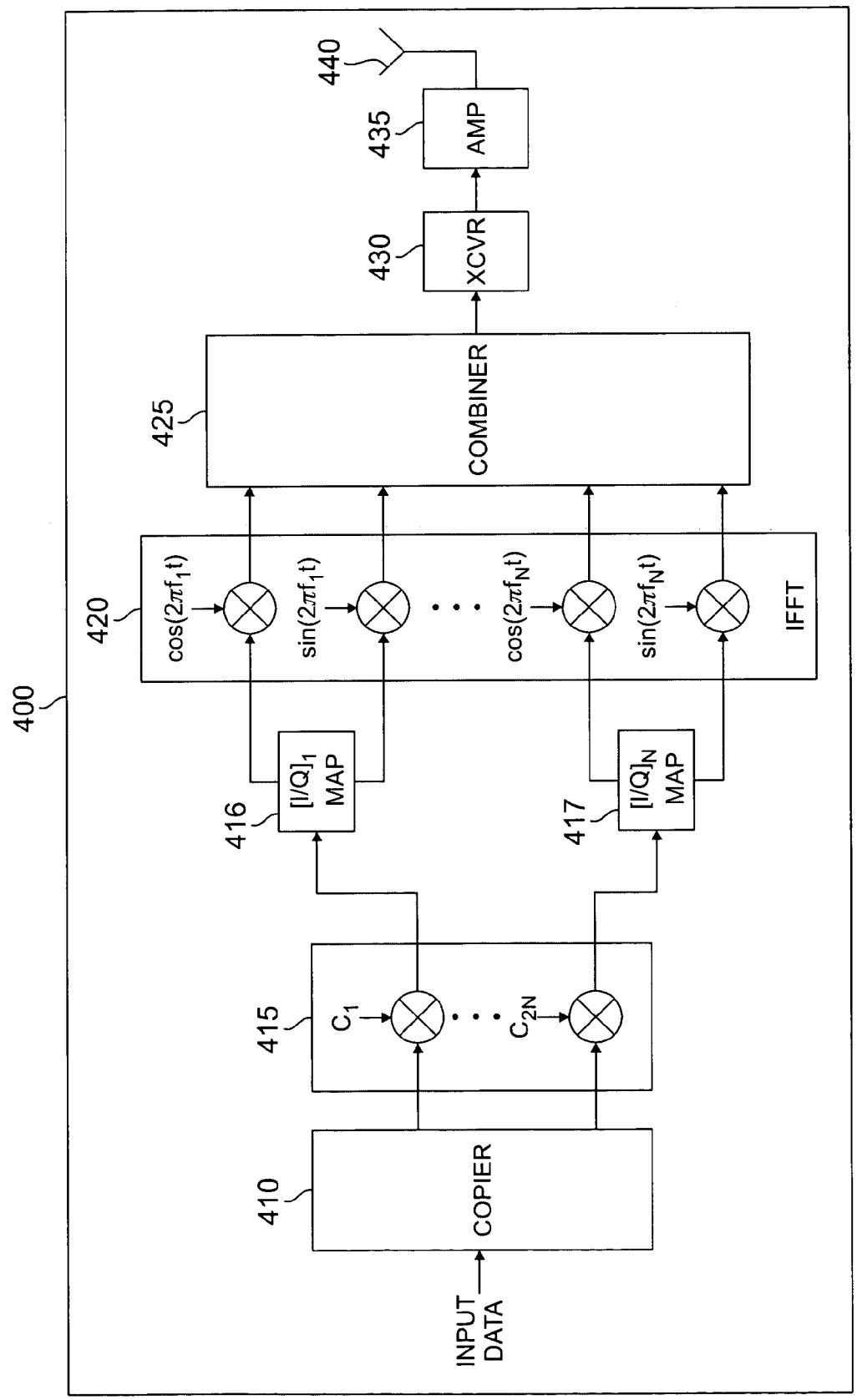
FIG. 4 illustrates a transmit path of a conventional multicarrier CDMA wireless device using QPSK modulation according to an exemplary embodiment of the prior art.

FIG. 4 illustrates a transmit path of exemplary multicarrier CDMA wireless device 400, which uses QPSK modulation according to an exemplary embodiment of the prior art. In FIG. 4, MC-CDMA wireless device 400 may be, for example, base station (BS) 101 or mobile station (MS) 111. The exemplary architecture of MC-CDMA wireless device 400 is similar to that of conventional MC-CDMA wireless devices.

The transmit path of exemplary MC-CDMA wireless device 400 comprises copier block 415, spreading chip multiplier stages 415 of length 2N, a group of N I/Q map blocks, including exemplary [I/Q]$_1$ map block 416 and exemplary [I/Q]$_N$ map block 417, and subcarrier multiplier block 420, which may be implemented, for example, as an Inverse Fast Fourier Transform (IFFT) block. The transmit path of MC-CDMA-CDMA wireless device 400 further comprises combiner 425, transceiver (XCVR) 430, amplifier 435 and antenna 440.

Most of the functional block in MC-CDMA wireless device 400 have already been discussed in detail in FIGS. 2 and 3 and need not be discussed again in detail. Additionally, copier 410 may received input data from a frame formatting, channel encoding, interleaving and spreading block similar to frame formatting, channel encoding, interleaving and spreading block 305 in FIG. 3. However, for the sake of simplicity, such a frame formatting, channel encoding, interleaving and spreading block is not shown in FIG. 4.

MC-CDMA wireless device 400 differs from MC-CDMA wireless device 200 because of the use of quadrature phase shift keying (QPSK). Because QPSK is used, spreading chip multiplier stages 415 use 2N multipliers and 2N chip sequences, $C_i$, to spread the data streams from copier block 410, rather than only N multipliers, as in the case of BPSK in FIGS. 2 and 3. Chip sequences $C_1$ through $C_{2N}$ may be, for example, Walsh codes.

Exemplary [I/Q]$_1$ map block 416 maps pairs of chips at the output of spreading chip multiplier stages 415 onto an in-phase (I) chip stream (i.e., $\cos(2\pi f_1 t)$) and a quadrature (Q) chip stream (i.e., $\cos(2\pi f_1 t)$) for QPSK modulation on 2N subcarriers. Combiner 425 sums the sub-carriers prior to up-conversion to the transmission frequency by transceiver 430. Amplifier 435 amplifies the up-converted RF signal prior to transmission by antenna 440.

Figure 5:
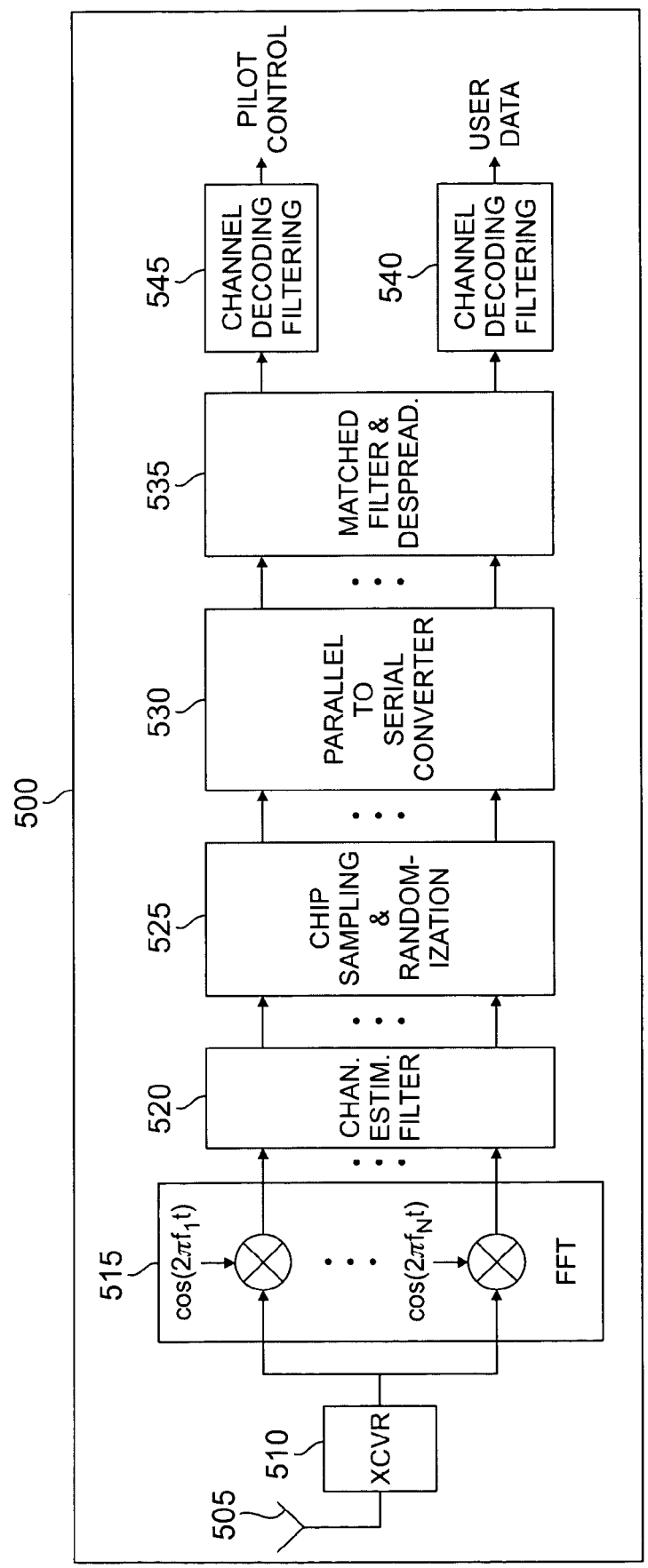
FIG. 5 illustrates a receive path of a multicarrier CDMA wireless device according to an exemplary embodiment of the present invention.

FIG. 5 illustrates selected portions of a receive path of multicarrier CDMA wireless device 500 according to an exemplary embodiment of the present invention. The receive path of MC-CDMA wireless device 500 comprises antenna 505, transceiver 510, Fast Fourier Transform (FFT) block 515, channel estimation filter 520, chip sampling and randomization block 525, parallel to serial converter 530, matched filter and despreading block 535, channel decoding and filtering block 540, and channel decoding and filtering block 545.

Figure 8:
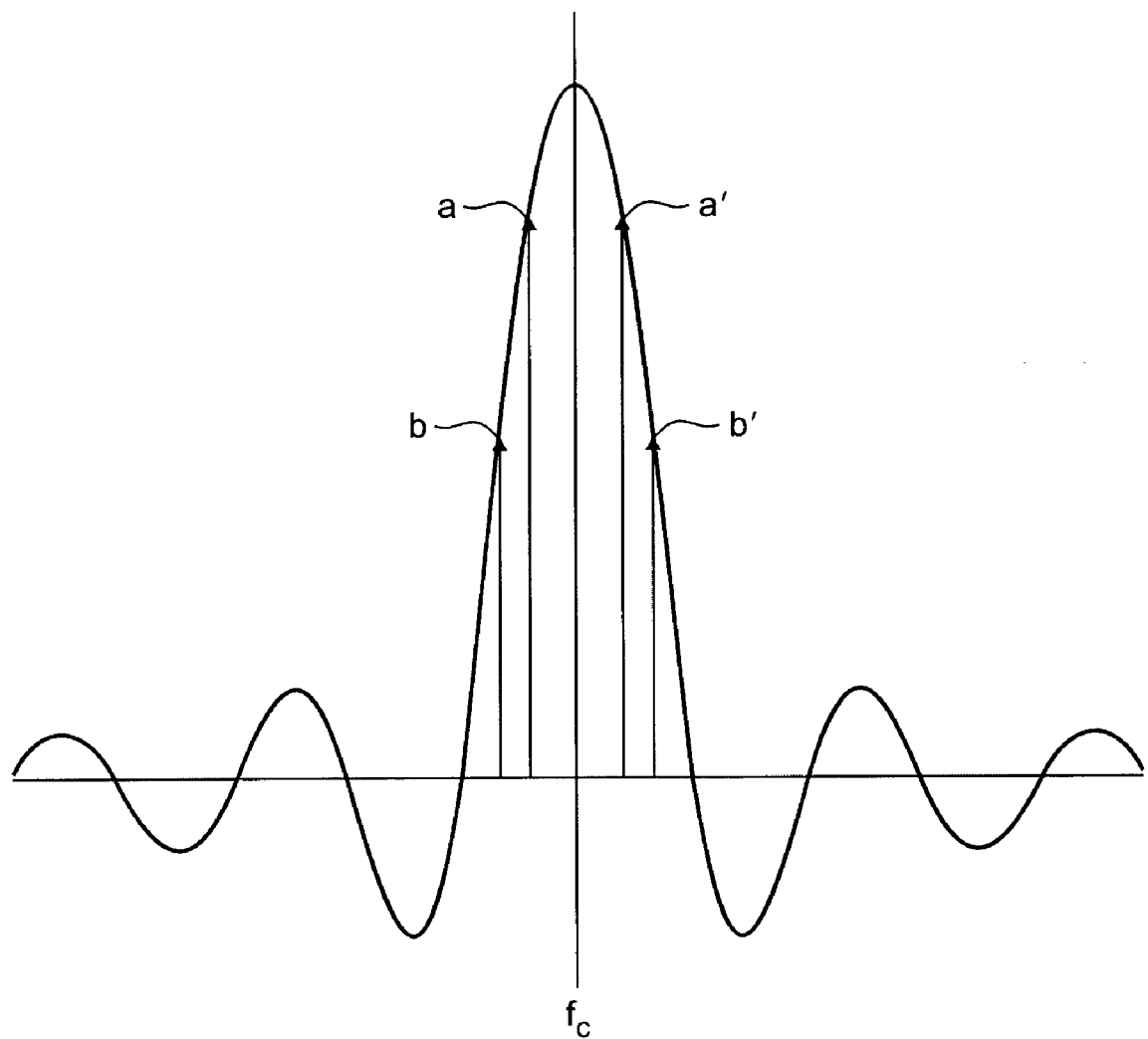
FIG. 8 illustrates the spectrum of the MC-CDMA transmitted signal in which digital modulation in the time domain produces offset sinc functions in the frequency domain.

Transceiver 510 amplifies and down-converts the RF signal received from antenna 505 and applies the down-converted signal to FFT block 515. FFT block 515 digitizes the down-converted signal and produces a sampled spectrum of the multi-carrier signal that represents the spread user data and pilot/control signals. For digital modulation, each multi-carrier spectral component on each output of FFT block 515 has the form of a sinc function centered on frequency $f_c$ as shown in FIG. 8. FIG. 8 illustrates the spectrum of the MC-CDMA transmitted signal in which digital modulation in the time domain produces offset sinc functions in the frequency domain, as given by the equation:

$$\mathrm{sinc}(fT) = \frac{\sin(\pi fT)}{\pi fT}.$$

The outputs of FFT block 515 are filtered by channel estimation filter 520 and the filtered outputs are applied to the inputs of chip sampling and randomization block 525. Chip sampling and randomization block 525 creates randomized pseudo-replicas of the original sampled multi-carrier signal according to the principles of the present invention. Chip sampling and randomization block 525 also combines the original sampled multi-carrier signal and the pseudo-replica signal and outputs the resultant signals to parallel-to-serial converter 530.

Parallel-to-serial converter 530 outputs chip sequences for the user data streams and the pilot and control signal streams. Matched filter and despreading block 325 correlates the output signals from parallel-to-serial converter 530 with the corresponding chip spreading sequences (i.e., Walsh codes) to recover the user data streams and the pilot and control channels signal streams. Ideally, the outputs of matched filter and despreading block 325 are the pilot and control signals and the user data streams that are output by frame formatting, channel encoding and interleaving blocks 305 and 310 in FIG. 3.

Channel decoding and filtering block 545 comprises conventional circuitry that reverses the interleaving, channel encoding, and formatting processes performed by frame formatting, channel encoding, interleaving and spreading block 325 to thereby generate the original pilot signals and the original control signals. Channel decoding and filtering block 540 comprises conventional circuitry that reverses the interleaving, channel encoding, and formatting processes performed by frame formatting, channel encoding, interleaving and spreading block 305 to thereby generate the original user data.

Figure 6:
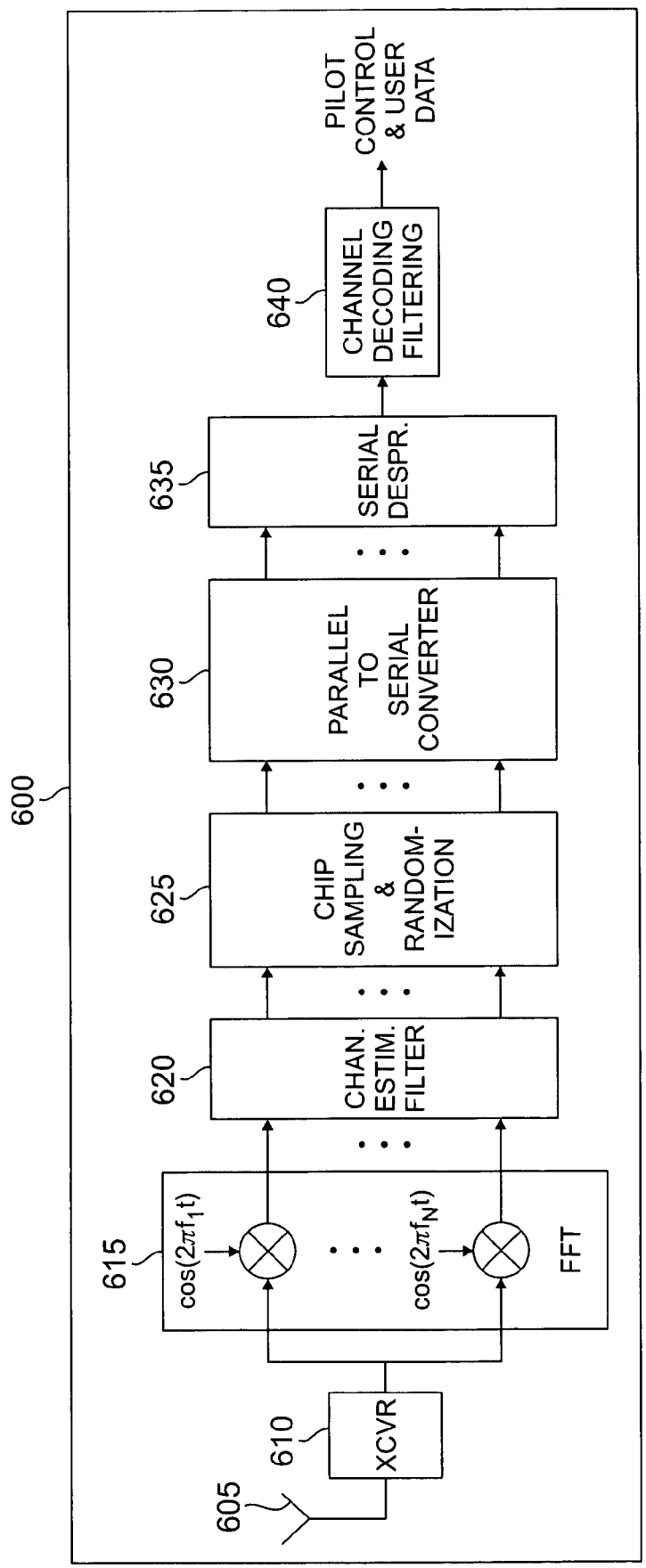
FIG. 6 illustrates a receive path of a multicarrier CDMA wireless device according to an exemplary embodiment of the present invention.

FIG. 6 illustrates a receive path of multicarrier CDMA wireless device 600 according to an exemplary embodiment of the present invention. The receive path of MC-CDMA wireless device 600 comprises antenna 605, transceiver 610, Fast Fourier Transform (FFT) block 615, channel estimation filter 620, chip sampling and randomization block 625, parallel-to-serial converter 630, serial despreading block 635, and channel decoding and filtering block 640.

Most of the functional block in MC-CDMA wireless device 600 have already been discussed in detail in FIG. 5 and need not be discussed again in detail. Whereas MC-CDMA wireless device 500 despreads pilot and control signals separately from user data signals, MC-CDMA wireless device 600 is more suited to receive the transmitted signals sent by MC-CDMA wireless device 200 in FIG. 2. Thus, MC-CDMA wireless device 600 only requires a serial dispreading block 635 and one channel decoding and filtering block 640 to recover the combined pilot, control and user data signals.

According to the principles of the present invention, interchanging samples of equivalent points in the spectrum, such as Sample (a) and Sample (a') or Sample (b) and Sample (b') in FIG. 8, leaves the signal spectrum unchanged. Ideally, a sinc function is symmetric about the center frequency $f_c$, so that Sample (a) is located $\Delta f_1$ below $f_c$ and has the same amplitude as Sample (a'), which is located $\Delta f_1$ above $f_c$. Similarly, Sample (b) is located $\Delta f_2$ below $f_c$ and has the same amplitude as Sample (b'), which is located $\Delta f_2$ above $f_c$.

Hence, randomly distributing equivalent points that correspond to a Logic 1 value across multiple sinc functions in a multi-carrier spectrum leaves the spectral content unchanged. Likewise, randomly distributing equivalent points that correspond to a Logic 0 value across multiple sinc functions in a multi-carrier spectrum leaves the spectral content unchanged. The principle is similar to that described in U.S. Pat. No. 6,683,908 for randomizing time domain samples.

Figure 7:
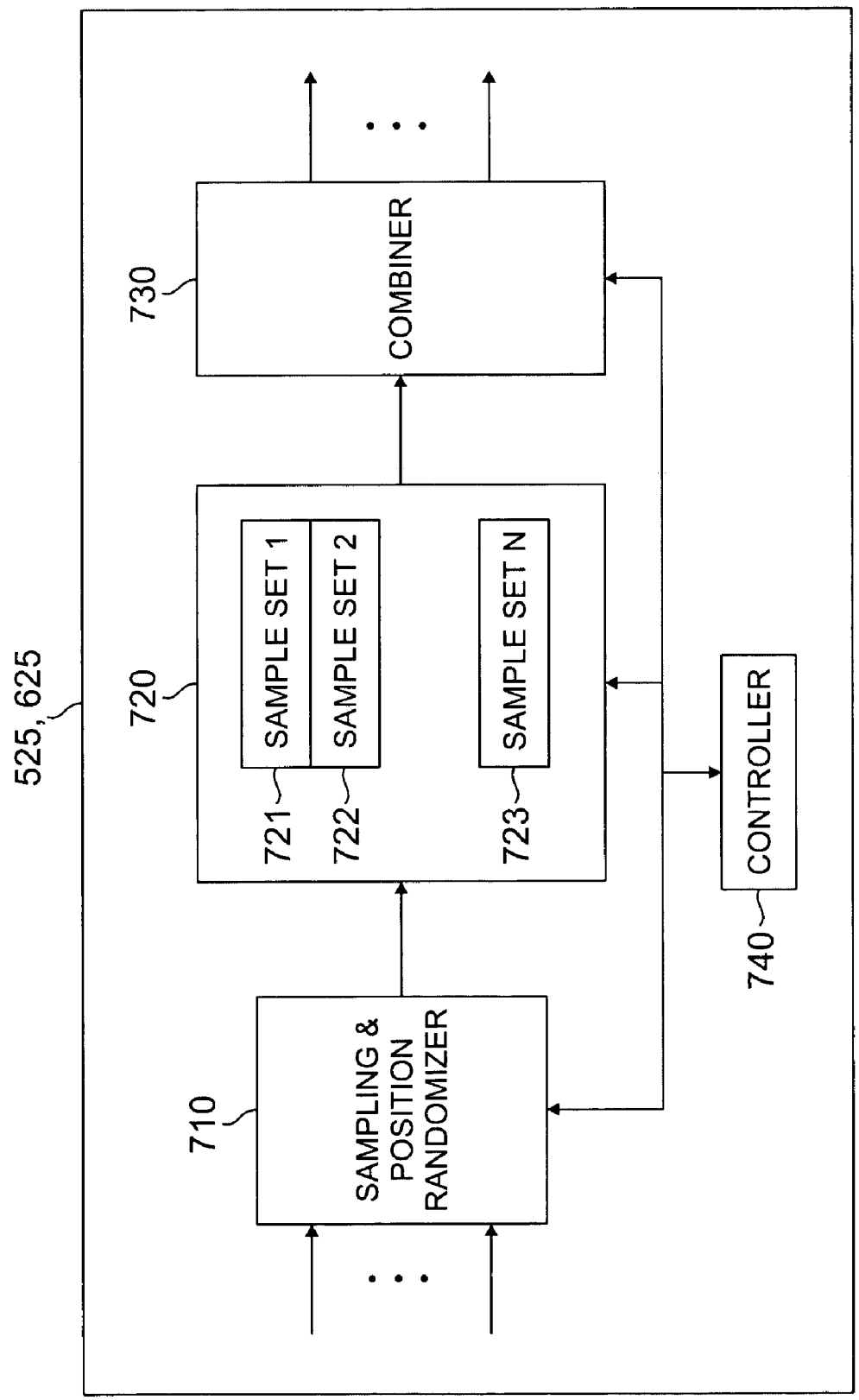
FIG. 7 illustrates an exemplary chip sampling and randomizing block in greater detail according to an exemplary embodiment of the present invention.

FIG. 7 illustrates chip sampling and randomization block 525 (or 625) in greater detail according to one embodiment of the present invention. Chip sampling and randomization block 525 creates randomized replicas of the sampled multi-carrier signal according to the principles of the present invention. Chip sampling and randomization block 525 comprises sampling and position randomizer 710, memory 720, combiner 730, and controller 740.

At the output of FFT blocks 515 and 615, there are J samples for each multi-carrier component (i.e., sinc function) for the sampled I signal and the sampled Q signal. For example, the sinc function in FIG. 8 at frequency $f_1$ may be sampled eight (8) times. The samples of the original signal are stored sequentially in memory 720 in memory block 721, which is labeled "Sample Set 1". To create each randomized pseudo-replica signal, controller 740 first determines the time slots of the time domain pilot channel signal that correspond to a Logic 1 and the time slots that correspond to a Logic 0 in the expected Pseudo-Noise (PN) code and Walsh Code (WC) chip sequence combination. The pilot channel signal is used because the chip sequence for the Pseudo-Noise (PN) code and Walsh Code (WC) of the pilot channel signal is known. Since the chip sequence is know, the locations of the Logic 1 and Logic 0 time slots also are known.

A clock circuit (not shown) synchronizes the start of the sampling processes with the CDMA chip timing, which allows controller 740 to accurately assign a particular sample to a specific time slot in a chip. Controller 740 designates SLOT_1 as the set of time slots for a Logic 1 and designates SLOT_0 as the set of time slots for Logic 0 in the pilot channel PN sequence. Controller 740 uses set SAMPLE_1 to identify the set of sampled locations obtained for the corresponding Logic 1 time slots and uses set SAMPLE_0 to identify the set of sampled locations obtained for the corresponding Logic 0 time slots.

Controller 740 randomly places the sampled locations contained in SAMPLE_1 in the time slots of SLOT_1 and the sampled locations in SAMPLE_0 in the time slots designated in SLOT_0. The result is a pseudo-replica signal in which the original sample positions corresponding to Logic 1 are randomly redistributed among Logic 1 time slots and the original sample positions corresponding to Logic 0 are randomly redistributed among Logic 0 time slots. The randomized samples of the new pseudo-signal are stored in memory block 722, labeled "Sample Set 2". Controller 740 may then repeat the randomization process described above to generate up to N pseudo-replica signals that are stored in other memory blocks, such as memory block 723, labeled "Sample Set N".

At the conclusion of J chip time-intervals, there are N sampled signals for which the samples corresponding to expected Logic 1 values are randomly distributed among expected Logic 1 positions. Also, at the conclusion of J chip time-intervals, there are N sampled signals for which the samples corresponding to expected Logic 0 values are randomly distributed among expected Logic 0 positions. It is noted that if the received signal is time-aligned with the expected code sequence of the pilot signal, then randomly placing the Logic 1 samples within the SAMPLE_1 positions does not change the received chip sequences. Similarly, randomly placing the Logic 0 samples-within the SAMPLE_0 positions does not change the received chip sequence in this case.

Upon acquiring J×K samples, controller 740 instructs combiner 730 to sum the N pseudo-replica signal and the original signal and despread the reconstructed signal with a correlator or matched filter. For the case where the sampled signal is time aligned with the expected PN code and Walsh code sequences, the summation by controller 740 results in coherent combining of the desired signal components and non-coherent combining of the undesired noise and interference components. The result is improved Ec/No for better detection performance. By creating randomized signal pseudo-replicas of each sample, the processing time is reduced over previous methods. Improvement of the Ec/No improves the Eb/No value at the matched filter output, which provides operation closer to the Shannon limit.

It is noted that chip sampling and randomization block 525 (or 625) in FIG. 7 is not limited to use with frequency domain signals. Chip sampling and randomization block 525 (or 625) may also be used to generates pseudo-replica signals at high data rates for time domain signals, as in the case of U.S. Pat. No. 6,683,908.

The present invention improves the performance of wireless digital communications systems by: 1) reducing the required $E_b/N_o$ at the CDMA receiver and detector; 2) reducing the impact of multipath delay on inter-symbol interference; 3) reducing the transmit power required by transmitters for reliable transmission; 4) reducing the interference caused by multiple transmitters in the assigned spectrum; and 5) reducing the battery power required for mobile subscribers in a wireless communications system. It will have a particularly beneficial effect on spectrum utilization by communications systems that employ code division multiple access (CDMA) techniques where all transmitters use the same spectrum by reducing potential interference from other users.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a CDMA receiver, a noise reduction circuit for improving a signal-to-noise ratio of an input signal corresponding to a predetermined sequence of chips, each of said chips having a value corresponding to Logic 0 or Logic 1, said noise reduction circuit comprising:

a sampling circuit capable of generating a first sequence of samples of said input signal;

a controller capable of identifying samples in said first sequence of samples corresponding to Logic 0 chips and identifying samples in said first sequence of samples corresponding to Logic 1 chips;

a randomizing circuit capable of generating a second sequence of samples by at least one of:
shifting positions within said first sequence of samples of at least some of said identified samples corresponding to Logic 0 chips, wherein each of said shifted samples corresponding to Logic 0 chips is shifted from a first position corresponding to a Logic 0 chip to a second position corresponding to a Logic 0 chip; and
shifting positions within said first sequence of samples of at least some of said identified samples corresponding to Logic 1 chips, wherein each of said shifted samples corresponding to Logic 1 chips is shifted from a first position corresponding to a Logic 1 chip to a second position corresponding to a Logic 1 chip; and a memory coupled to said randomizing circuit capable of storing said first sequence of samples in a first sample set and storing said second sequence of samples in a second sample set.

2. The noise reduction circuit as set forth in claim 1 further comprising a combiner circuit capable of adding said first and second sequences of samples in said memory to thereby generate a composite sequence of samples having a reduced signal-to-noise ratio.

3. The noise reduction circuit as set forth in claim 2 further comprising a matched filter for correlating said composite sequence of samples with said predetermined sequence of chips.

4. The noise reduction circuit as set forth in claim 3 wherein said CDMA receiver is disposed in a base station of a wireless network.

5. The noise reduction circuit as set forth in claim 3 wherein said CDMA receiver is disposed in a mobile station capable of communicating with a wireless network.

6. The noise reduction circuit as set forth in claim 3 wherein said randomizing circuit shifts positions of said at least some of said identified samples corresponding to Logic 0 chips according to one of a random process algorithm and a predetermined algorithm.

7. The noise reduction circuit as set forth in claim 3 wherein said randomizing circuit shifts positions of said at least some of said identified samples corresponding to Logic 1 chips according to one of a random process algorithm and a predetermined algorithm.

8. A CDMA wireless network comprising a plurality of base stations, each of said base stations comprising a noise reduction circuit for improving a signal-to-noise ratio of an input signal corresponding to a predetermined sequence of chips, each of said chips having a value corresponding to Logic 0 or Logic 1, said noise reduction circuit comprising:

a sampling circuit capable of generating a first sequence of samples of said input signal;

a controller capable of identifying samples in said first sequence of samples corresponding to Logic 0 chips and identifying samples in said first sequence of samples corresponding to Logic 1 chips;

a randomizing circuit capable of generating a second sequence of samples by at least one of:
shifting positions within said first sequence of samples of at least some of said identified samples corresponding to Logic 0 chips, wherein each of said shifted samples corresponding to Logic 0 chips is shifted from a first position corresponding to a Logic 0 chip to a second position corresponding to a Logic 0 chip; and
shifting positions within said first sequence of samples of at least some of said identified samples corresponding to Logic 1 chips, wherein each of said shifted samples corresponding to Logic 1 chips is shifted from a first position corresponding to a Logic 1 chip to a second position corresponding to a Logic 1 chip; and a memory coupled to said randomizing circuit capable of storing said first sequence of samples in a first sample set and storing said second sequence of samples in a second sample set.

9. The CDMA wireless network as set forth in claim 8 further comprising a combiner circuit capable of adding said first and second sequences of samples in said memory to thereby generate a composite sequence of samples having a reduced signal-to-noise ratio.

10. The CDMA wireless network as set forth in claim 9 further comprising a matched filter for correlating said composite sequence of samples with said predetermined sequence of chips.

11. The CDMA wireless network as set forth in claim 10 wherein said CDMA receiver is disposed in a base station of a wireless network.

12. The CDMA wireless network as set forth in claim 10 wherein said CDMA receiver is disposed in a mobile station capable of communicating with a wireless network.

13. The CDMA wireless network as set forth in claim 10 wherein said randomizing circuit shifts positions of said at least some of said identified samples corresponding to Logic 0 chips according to one of a random process algorithm and a predetermined algorithm.

14. The CDMA wireless network as set forth in claim 10 wherein said randomizing circuit shifts positions of said at least some of said identified samples corresponding to Logic 1 chips according to one of a random process algorithm and a predetermined algorithm.

15. For use in a CDMA receiver, a method of improving a signal-to-noise ratio of an input signal corresponding to a predetermined sequence of chips, each of the chips having a value corresponding to Logic 0 or Logic 1, the method comprising the steps of:
    generating a first sequence of samples of the input signal;
    identifying samples in the first sequence of samples corresponding to Logic 0 chips and identifying samples in the first sequence of samples corresponding to Logic 1 chips;
    generating a second sequence of samples by at least one of:
        shifting positions within the first sequence of samples of at least some of the identified samples corresponding to Logic 0 chips, wherein each of the shifted samples corresponding to Logic 0 chips is shifted from a first position corresponding to a Logic 0 chip to a second position corresponding to a Logic 0 chip; and
        shifting positions within the first sequence of samples of at least some of the identified samples corresponding to Logic 1 chips, wherein each of the shifted samples corresponding to Logic 1 chips is shifted from a first position corresponding to a Logic 1 chip to a second position corresponding to a Logic 1 chip;
    storing the first sequence of samples in a first sample set in a memory; and
    storing the second sequence of samples in a second sample set in the memory.

16. The method as set forth in claim 15 further comprising the step of adding the first and second sequences of samples to generate a composite sequence of samples having a reduced signal-to-noise ratio.

17. The method as set forth in claim 16 further comprising the step of correlating the composite sequence of samples in a matched filter with predetermined sequence of chips.

18. The method as set forth in claim 17 wherein the step of shifting positions within the first sequence of samples of at least some of the identified samples corresponding to Logic 1 chips comprises the step of shifting positions of the at least some of the identified samples corresponding to Logic 1 chips according to one of a random process algorithm and a predetermined algorithm.

19. The method as set forth in claim 17 wherein the step of shifting positions within the first sequence of samples of at least some of the identified samples corresponding to Logic 0 chips comprises the step of shifting positions of the at least some of the identified samples corresponding to Logic 0 chips according to one of a random process algorithm and a predetermined algorithm.

20. The method as set forth in claim 17 wherein the step of shifting positions within the first sequence of samples of at least some of the identified samples corresponding to Logic 1 chips comprises the step of shifting positions of the at least some of the identified samples corresponding to Logic 1 chips according to one of a random process algorithm and a predetermined algorithm.

* * * * *